(No Model.)
F. H. THOMPSON & G. P. TORMEY.
DEVICE FOR SECURING TOOLS TO HANDLES.
No. 404,663. Patented June 4, 1889.
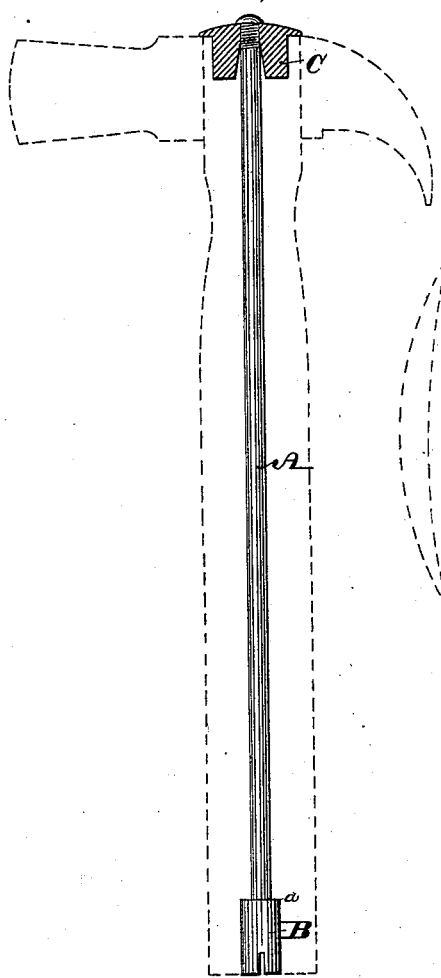
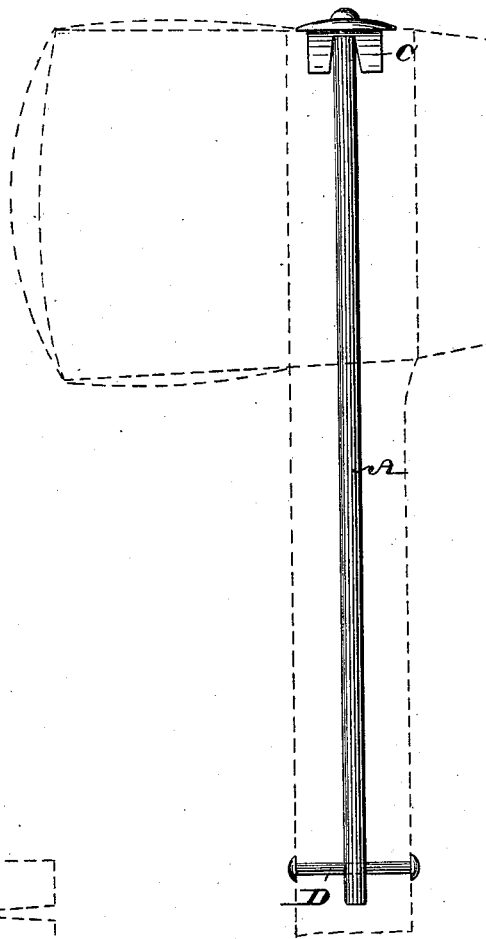
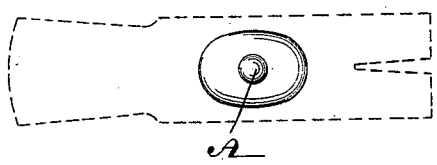

UNITED STATES PATENT OFFICE.

FRANK H. THOMPSON AND GEORGE P. TORMEY, OF PHILADELPHIA, PENNSYLVANIA.

DEVICE FOR SECURING TOOLS TO HANDLES.

SPECIFICATION forming part of Letters Patent No. 404,663, dated June 4, 1889.

Application filed April 26, 1888. Serial No. 271,885. (No model.)

*To all whom it may concern:*

Be it known that we, FRANK H. THOMPSON and GEORGE P. TORMEY, citizens of the United States, residing in the city and county of Philadelphia, State of Pennsylvania, have invented a new and useful Improvement in Devices for Securing Tools to Handles, which improvement is fully set forth in the following specification and accompanying drawings.

Our invention consists of a device for securing a tool to its handle in a convenient, inexpensive, and reliable manner, as will be hereinafter fully set forth.

Figure 1 represents a partial elevation and partial vertical section of a device for securing a tool to its handle embodying our invention. Fig. 2 represents a top or plan view thereof. Fig. 3 represents an end view of a portion thereof. Fig. 4 represents a side elevation of a modification.

Similar letters of reference indicate corresponding parts in the several figures.

Referring to the drawings, A represents a stem or rod, which in Fig. 1 is screw-threaded at one end and provided with a head B at the other end.

C represents a wedge, which has a threaded opening to receive the threaded end of said rod A.

The handle of the tool has a bore through the same for the passage of the rod A, and is widened for the reception of the head B thereof, forming a shoulder, as at $a$, the said head having a nick, so as to be engaged by a screw-driver for rotating the rod.

The operation is as follows: The wedge is struck so as to be partly driven into the end of the handle around the eye of the tool and the rod rotated until its head tightens against the wall of the bore. The wedge is then driven into the handle to greater extent and the rod again rotated, and these operations are repeated until the wedge is "home," when the end of the rod projecting outside of the head of the wedge is shortened, if necessary, and then "headed," hammered, or riveted upon the head of the wedge, whereby the wedge is firmly and reliably held in position, the rod being prevented from displacement owing to its connection at one end with the wedge and the abutment of the head B at the other end.

When the tool becomes loose, it may be readily tightened by further hammering or riveting the end of the rod on the head of the wedge, said rod being rotated, if required, prior to such action.

The thread on the rod may be dispensed with, if desired, it being an advantage, but not a necessity.

In Fig. 4 the device is shown as applied to an ax or other tool having a long handle. In this case the handle has an opening or bore part of its length, and the rod or stem is inserted in the same and fastened by a pin D, which is driven or passed through the handle and the rod at a right angle thereto, and its ends are secured by hammering or riveting on the outside of the handle. The end of the rod about the eye of the tool is not screw-threaded, but passes freely through the same.

When the rod is inserted in the bore of the handle and secured, the wedge is fitted on the projecting end thereof and driven into the handle, after which the end of the rod is hammered or riveted on the head of the wedge, whereby the latter is firmly held in position and prevented from displacement, the tool being thereby reliably connected with the handle.

The head of the wedge is widened, so as to strengthen the same, and provides an enlarged surface for receiving the blows imparted to it for driving purposes.

Having thus described our invention, what we claim as new, and desire to secure by Letters Patent, is—

1. A tool-handle with a bore extending lengthwise thereof, a rod with head and a screw-threaded end, and a wedge interiorly screw-threaded, said wedge being driven into said handle and the screw end of said rod inserted in said wedge and riveted to the wedge, said parts being combined substantially as described.

2. A tool-handle with bore having a shoulder on the wall thereof, as described, a wedge with an opening therein, a headed rod having one end inserted in said wedge and riveted thereon and its headed portion bearing against said shoulder, said parts being combined substantially as described.

3. A tool-handle with bore, a wedge with an opening therein, a rod having one end inserted in said wedge and riveted thereto, the other end having an attachment or projection adapted to engage a wall on the inner portion of the handle at an angle to the bore, substantially as described.

FRANK H. THOMPSON.
GEORGE P. TORMEY.

Witnesses:
JOHN A. WIEDERSHEIM,
A. P. JENNINGS.